United States Patent [19]
Cheng et al.

[11] Patent Number: 5,845,390
[45] Date of Patent: Dec. 8, 1998

[54] STRUCTURE OF PM STEP MOTOR AND ITS FABRICATION

[76] Inventors: Chun-Ying Cheng, 13 Fl., No. 213, Ching-Shui Rd., Tu-Cheng City, Taipei Hsien; Ken Lee, No. 5, Alley 24, Lane 71, Ta-Chih St., Pan-Chiao City, Taipei Hsien, both of Taiwan

[21] Appl. No.: 944,182

[22] Filed: Oct. 6, 1997

[51] Int. Cl.[6] .................................................. H02K 15/02
[52] U.S. Cl. ................................ 29/596; 310/42; 310/43; 310/49 R; 310/71
[58] Field of Search ........................ 29/596, 598; 310/42, 310/43, 49 R, 71

[56] References Cited

U.S. PATENT DOCUMENTS 5,598,046  1/1997  Miyazawa et al. .................... 29/596 X

*Primary Examiner*—Carl E. Hall
*Attorney, Agent, or Firm*—Bacon & Thomas

[57] ABSTRACT

A PM step motor fabrication method including the steps of i) preparing two windings, ii) fastening two annular intermediate metal plates together by spot welding, iii) mounting the windings on the annular intermediate metal plates, then covering two annular cover shells on the windings, and then fastening a top cap with an axle bearing to one annular cover shell, and then injection-molding a plastic packing member on the top cap within the annular cover shells to form a stator, iv) preparing a rotor, v) processing axle cap with an axle bearing by injection-molding, and vi) installing the rotor in the stator, permitting it to be supported on the axle bearing of the top cap and the axle bearing of the axle cap.

3 Claims, 6 Drawing Sheets

STRUCTURE OF PM STEP MOTOR AND ITS FABRICATION

BACKGROUND OF THE INVENTION

The present invention relates to a PM (phase modulation) step motor which is easy to manufacture, and produces low noise during its operation. The invention relates also to method of fabricating such a PM step motor.

Step motors are intensively used in office automation apparatus such as fax machines, scanners, etc. According to conventional step motor fabrication methods, enameled wires are wound round two wire reels to form two windings, then the windings are respectively mounted around two joined intermediate metal plates within two cover shells to form a stator. The cover shells have through holes into which liquid plastic is filled into the assembly of the cover shells, the windings and the intermediate metal plates, and molded into a plastic core to fix the assembly in unity. Because the temperature of the liquid plastic is quite high, the insulator of the enameled wires of the windings may be melted when the liquid plastic is filled into the inside of the assembly of the cover shells, the windings and the intermediate metal plates, thereby causing a short circuit. Further, when the stator has been made, a rotor is mounted in the stator, and then a top cover and an axle cap are respectively mounted with a respective axle bearing and then fastened to the stator, for permitting the rotor to be revolvably supported on the axle bearings of the top cover and the axle cap. Because the axle bearings are respectively mounted on the top cap and the axle cap manually, high noise tends to be produced during the operation of the step motor. This complicated step motor fabrication method must be improved.

SUMMARY OF THE INVENTION

The present invention has been accomplished to provide a step motor fabrication method which eliminates the aforesaid drawbacks. According to one aspect of the present invention, the top cap and the axle cap are respectively molded on the respective axle bearings by injection-molding, therefore the step motor produces little noise when the rotor is turned in the axle bearings of the top cap and the axle cap within the stator. According to another aspect of the present invention, the top cap is integral with the stator by an injection-molded plastic packing element. According to still another aspect of the present invention, the injection-molded plastic packing element fills up the gaps in the intermediate metal plates within the cover shells. According to still another aspect of the present invention, the axle cap has a plurality of mounting holes respectively forced into engagement with respective projecting rods of the injection-molded plastic packing element and then fixedly secured thereto by a ultrasonic welding apparatus.

DETAILED DESCRIPTION OF THE PREFERRED EMBODIMENT

Figure 1:
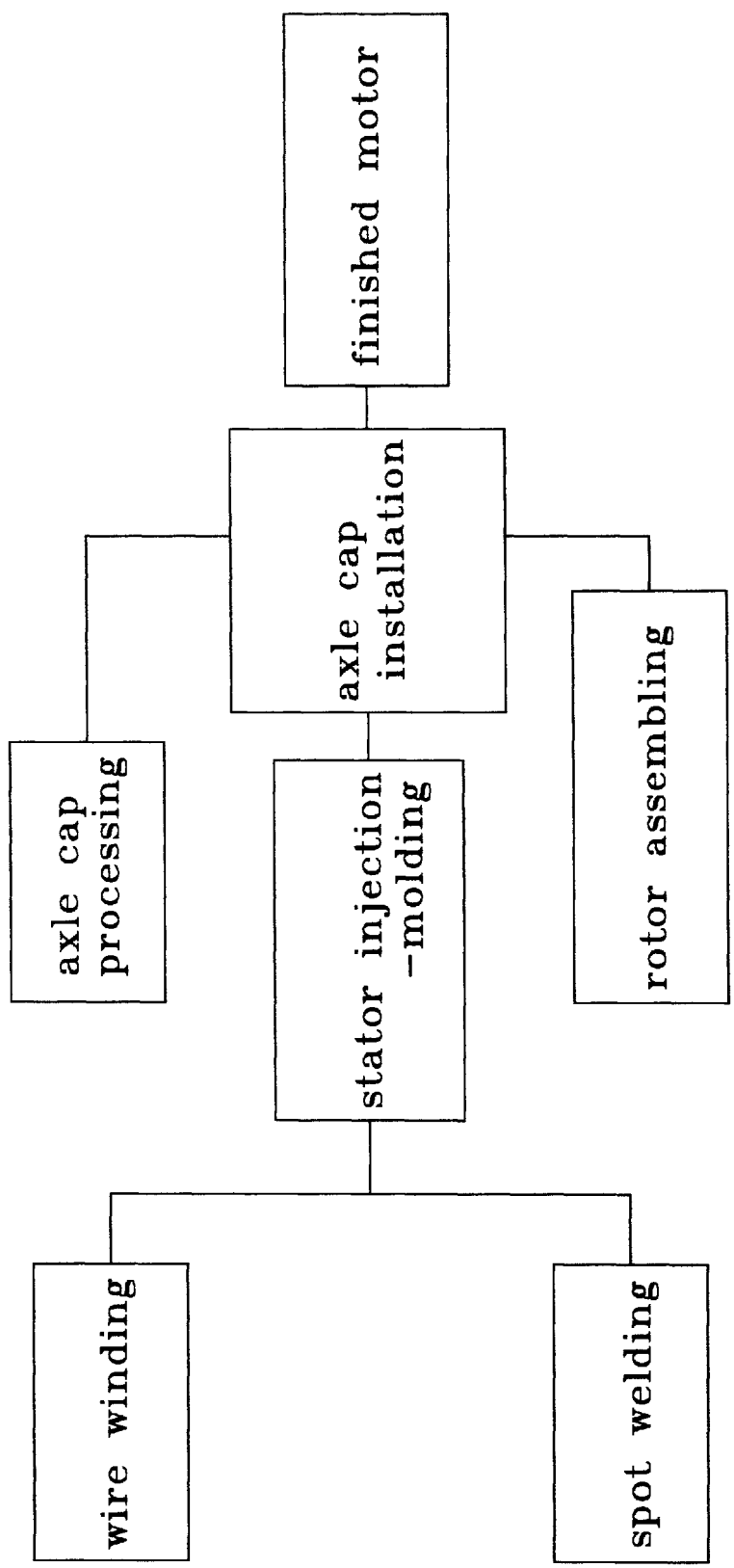
FIG. 1 is a step motor fabrication flow chart according to the present invention.
Figure 2:
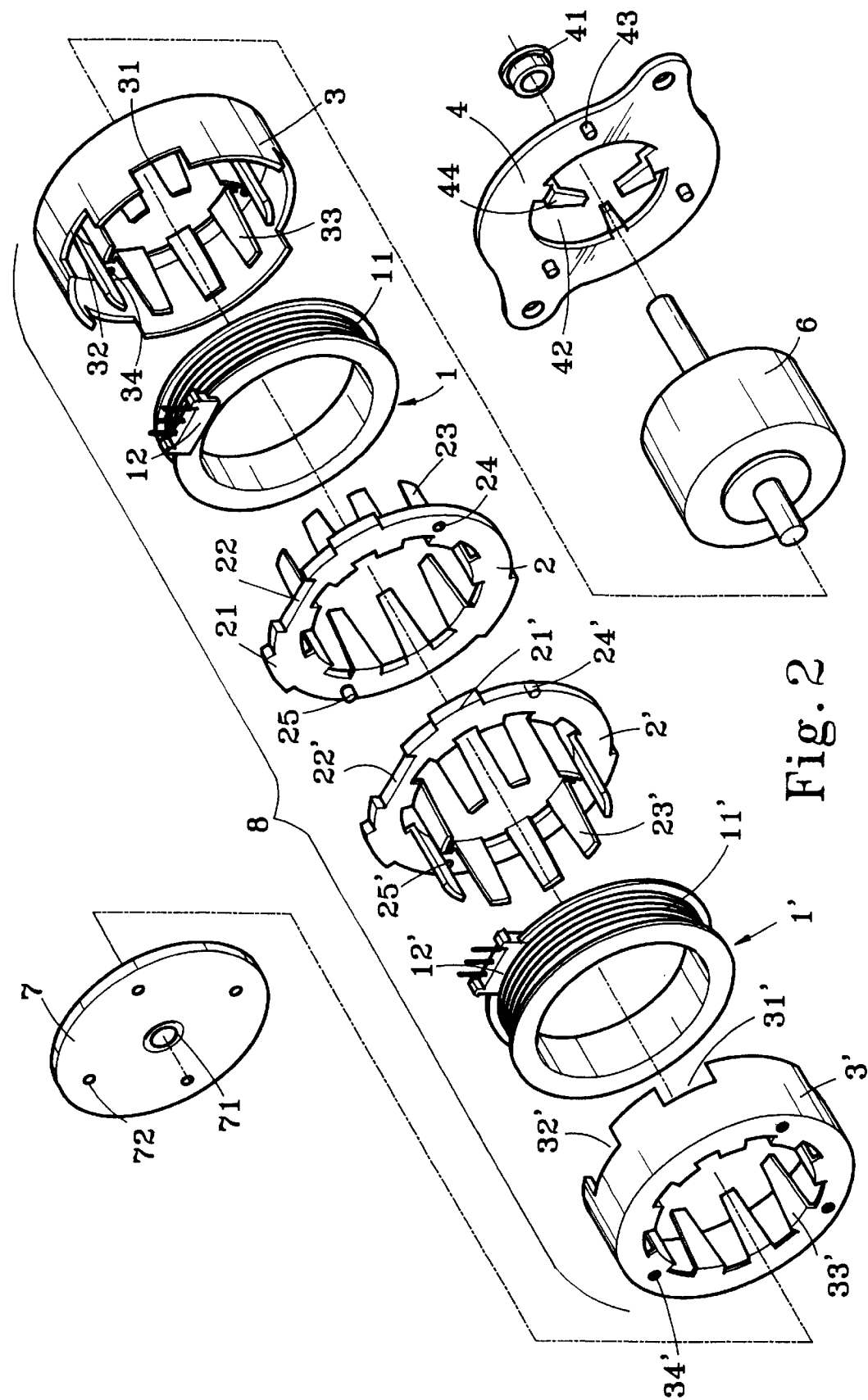
FIG. 2 is an exploded view of a step motor according to the present invention.
Figure 3:
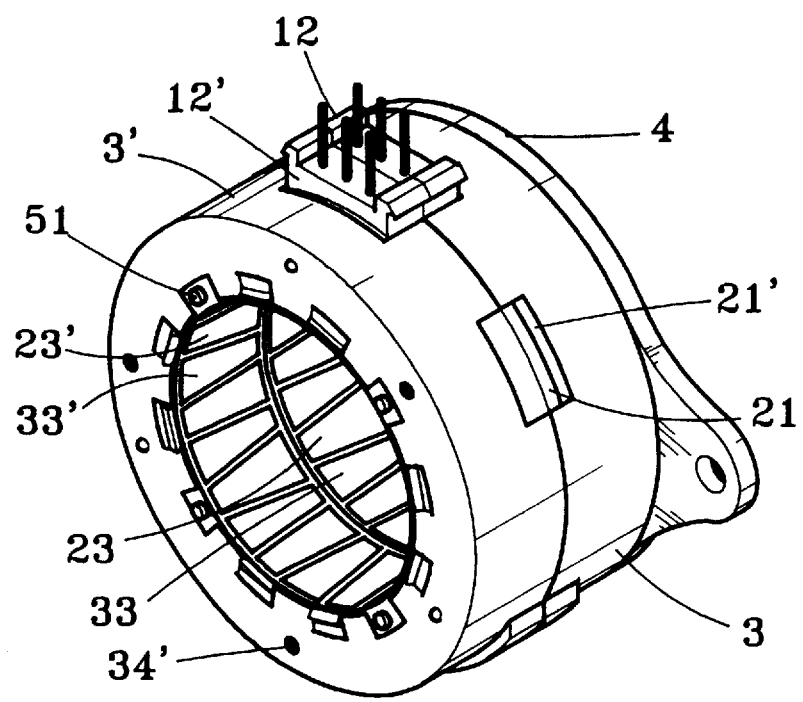
FIG. 3 is an elevational view of a stator for a step motor according to the present invention.
Figure 4:
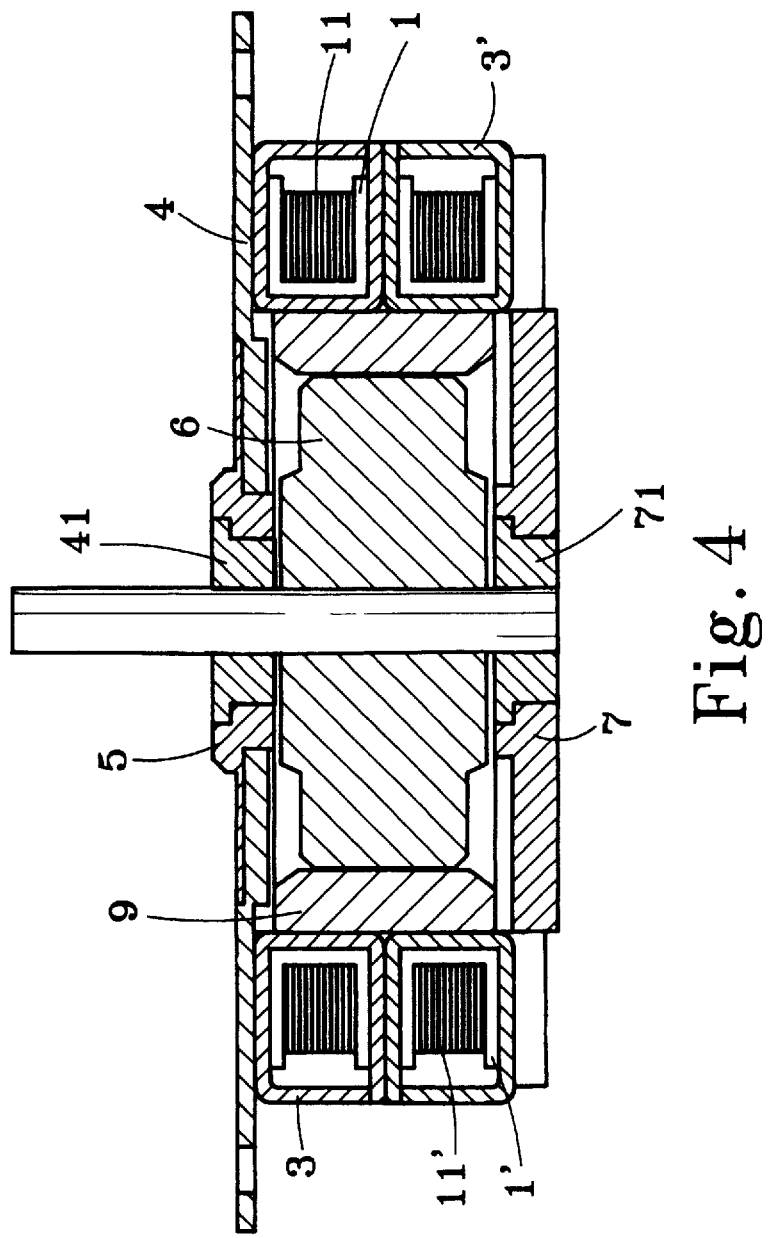
FIG. 4 is a sectional view taken along line IV—IV of FIG. 5.
Figure 5:
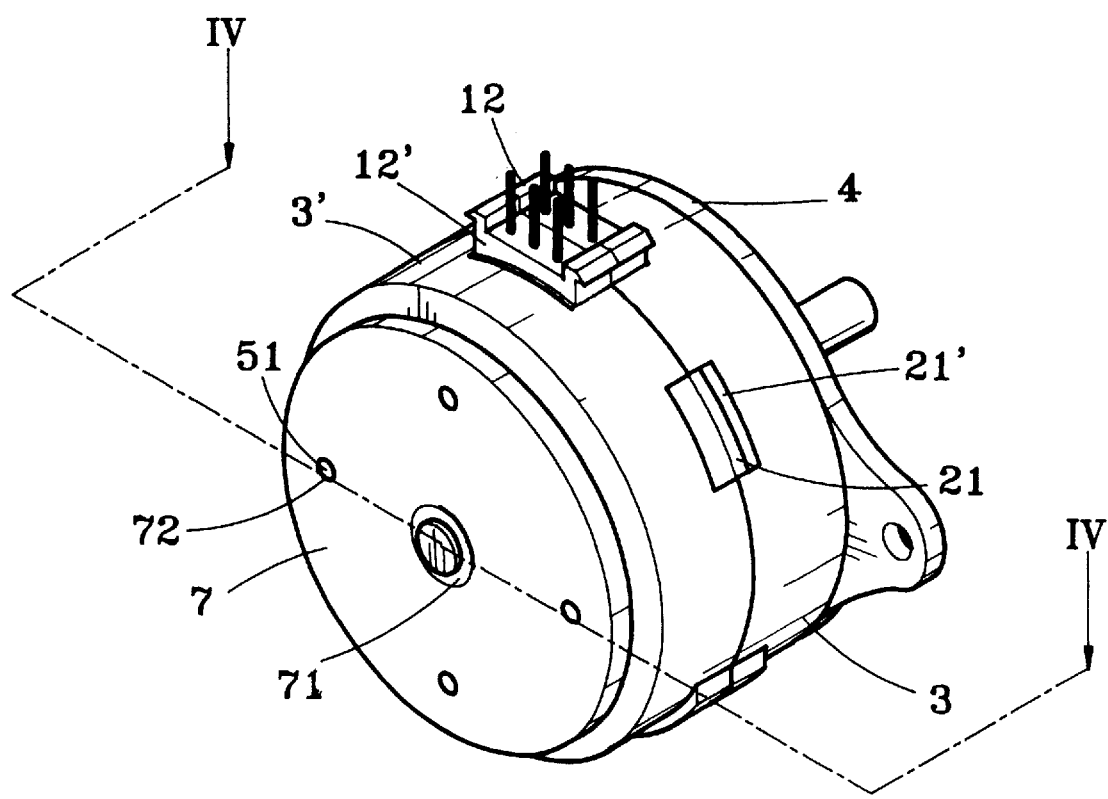
FIG. 5 is an elevational view of a step motor according to the present invention.
Figure 6:
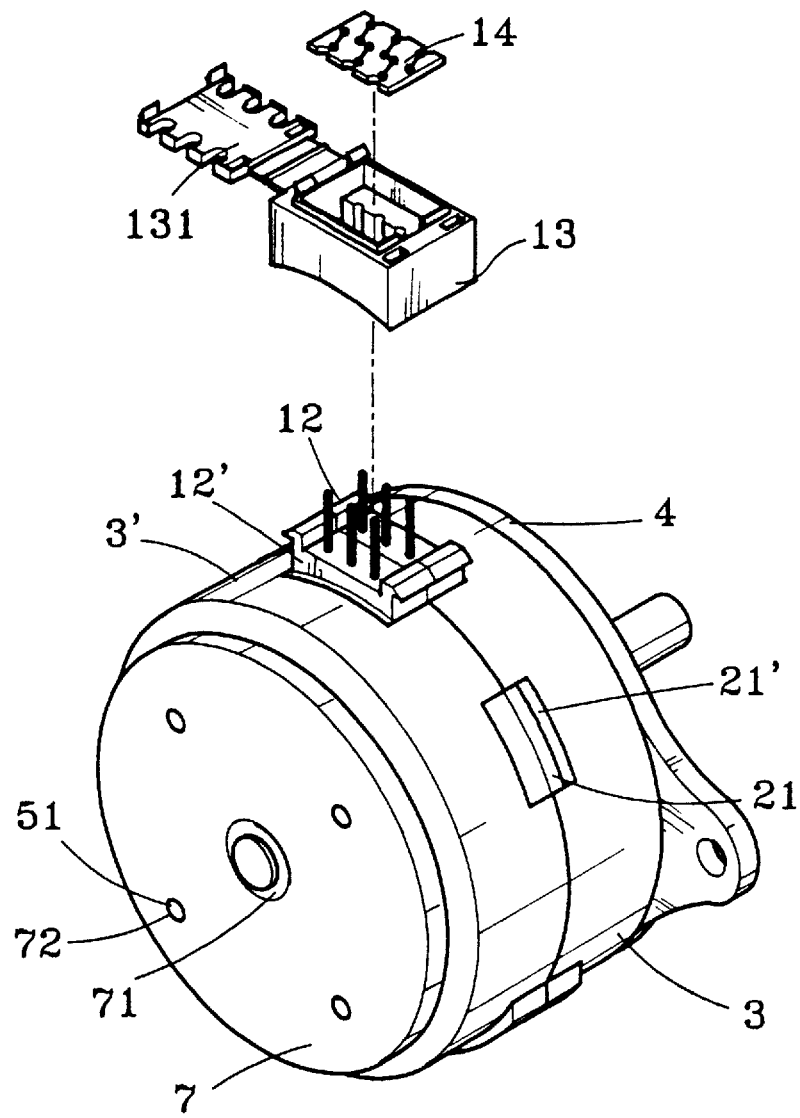
FIG. 6 shows the positioning of a printed circuit board and a terminal holder covering on the step motor according to the present invention.

Referring to FIG. 1, a PM (phase modulation) step motor fabrication method includes the steps of i) wire winding, ii) spot welding, iii) stator injection-molding, iv) rotor assembling, v) axle cap processing, and vi) axle cap installation.

Referring to Figures from 2 to 6 and FIG. 1 again, the step of i) wire winding is to prepare windings by winding two enameled wires 11;11' round two wire reels 1;1', permitting respective lead ends of the enameled wires 11;11' to be fastened to respective terminal holders 12;12' of the wire reels 1;1'. The step of spot welding ii) is to prepare two annular intermediate metal plates 2;2', and then to fasten the annular intermediate metal plates 2;2' back-to-back together by spot welding. The annular intermediate metal plates 2;2' comprise each a plurality of coupling flanges 21;21' and a plurality of coupling notches 22;22' alternatively arranged around the periphery, a pin 25;24' and a pin hole 24;25' bilaterally disposed at a back side, and a plurality of axial teeth 23;23' equiangularly spaced at a front side. The annular intermediate metal plates 2;2' are fastened together by forcing the respective pins 25;24' into engagement with the respective pin holes 24;25' and then welding the connections between the pins 25;24' and the pin holes 24;25'. The step of iii) stator injection-molding is to make a stator 8 by: preparing two annular cover shells 3;3' which comprise each a plurality of first bottom notches 31;31' and a second bottom notch 32;32' spaced around the periphery at the bottom side, a plurality of equiangularly spaced and downwardly extended axial teeth 33;33', and a plurality of equiangularly spaced mounting holes 34;34' at the top side, then mounting the windings of the wire reels 1;1' and enameled wires 11;11' around the axial teeth 23;23' of the joined annular intermediate metal plates 2;2', and then respectively mounting the annular cover shells 3;3' on the windings of the wire reels 1;1' and enameled wires 11;11', permitting the first bottom notches 31;31' of the annular cover shells 3;3' to be respectively forced into engagement with the coupling flanges 21;21' of the annular intermediate metal plates 2;2' and the terminal holders 12;12' of the wire reels 1;1' of the windings to be retained in the second bottom notches 32;32' of the annular cover shells 3;3', and then preparing a top cap 4 which comprises a center opening 42, a plurality of locating pins 43 equiangularly spaced around the center opening 42 at one side and a plurality of pawls 44 respectively projecting into the center opening 42, and then attaching an axle bearing 41 to the top cap 4, permitting it to be retained to the pawls 44 within the center opening 42, and then securing the top cap 4 to one annular cover shell 3, permitting the locating pins 43 of the top cap 4 to be respectively forced into the mounting holes 34 of the annular cover shell 3, and then putting the assembly of the annular intermediate metal plates 2;2', the windings of the wire reels 1;1' and enamel wires 11;11', the cover shells 3;3', the top cap 4 and the axle bearing 41 in an injection molding mold for injection-molding into a stator 8, permitting injection-molded plastic 5 to fill up the center opening 42 of the top cap 4 and gaps in between the axial teeth 23;23' of the joined annular intermediate metal plates 2;2' and the axial teeth 33;33' of the cover shells 3;3' within the wire reels 1;1'. The step of iv) rotor assembling is to assemble a magnet 9 and a rotor shaft into a rotor 6. The step of v) axle cap processing is to put an axle bearing 71 in a mold, then to fill a fluid plastic in the mold, and then to injection-mold the fluid plastic material and the axle bearing 71 into an axle cap 7 having a plurality of locating holes 72 equiangularly spaced around the axle bearing 71. The step of vi) axle cap installation is to install the rotor 6 obtained from step iv) in the stator 8 obtained from step iii), permitting the rotor shaft of the rotor 6 to be supported on the axle bearing 41 of the top cap 4 and the axle bearing 71 of the axle cap 7, then to attach the axle cap 7 obtained from step v) to the stator 8, permitting the locating holes 72 of the axle cap 7 to be forced into engagement with respective projecting rods 51 of the injection-molded plastics 5 of the stator 8, and then to seal the axle cap 7 and the stator 8 together by an ultrasonic welding apparatus, and then to prepare a terminal holder covering 13 which has a hinged lid 131, and then to fixedly mount the terminal holder covering 13 on the terminal holders 12;12' outside the cover shells 3;3', and then to mount a printed circuit board 14 in the terminal holder covering 13 and electrically connect the lead ends of the enameled wires 11;11', and then to cover the hinged lid 131 of the terminal holder covering 13.

What I claim is:

1. A PM (phase modulation) step motor fabrication method including the steps of:

i) preparing two windings, said windings having a respective terminal holders at the periphery;

ii) preparing two annular intermediate metal plates and then fastening said annular intermediate metal plates back-to-back together by spot welding, said annular intermediate metal plates comprising each a plurality of coupling flanges and a plurality of coupling notches alternatively arranged around the periphery, a pin and a pin hole bilaterally disposed at a back side, and a plurality of axial teeth equiangularly spaced at a front side, said annular intermediate metal plates being fastened together by forcing the respective pins into engagement with the respective pin holes and then welding the connections between said pins and said pin holes by spot welding;

iii) preparing a stator by: preparing a first annular cover shell and a second annular cover shell, said first annular cover shell and said second annular cover shell comprising each a plurality of first bottom notches and a second bottom notch spaced around the periphery at a bottom side, a plurality of equiangularly spaced and downwardly extended axial teeth, and a plurality of equiangularly spaced mounting holes at a top side, then mounting said windings around the axial teeth of said annular intermediate metal plates, and then respectively mounting said first annular cover shell and said second annular cover shell on said windings, permitting the first bottom notches of said annular cover shells to be respectively forced into engagement with the coupling flanges of said annular intermediate metal plates and the terminal holders of said windings to be retained in the second bottom notches of said annular cover shells, and then preparing a top cap which comprises a center opening, a plurality of locating pins equiangularly spaced around its center opening at one side and a plurality of pawls respectively projecting into its center opening, and then fastening an axle bearing to said pawls, and then securing said top cap to said first annular cover shell, permitting the locating pins of said top cap to be respectively forced into the mounting holes of said first annular cover shell, and then putting the assembly of said annular intermediate metal plates, said windings, said cover shells and said top cap in an injection molding mold, permitting the assembly to be injection molded with plastic material into a stator;

iv) assembling a magnet and a rotor shaft into a rotor;

v) preparing an axle cap by injection-molding, said axle cap having an axle bearing at the center and a plurality of locating holes equiangularly spaced around its axle bearing;

vi) installing said rotor in said stator, permitting the rotor shaft of said rotor to be supported on the axle bearing of said top cap and the axle bearing of said axle cap, then attaching said axle cap to said stator, permitting the locating holes of said axle cap to be forced into engagement with respective projecting rods of the injection-molded plastics of said stator, and then sealing said axle cap and said stator together by an ultrasonic welding apparatus; and vii) preparing a terminal holder covering having a hinged lid, and then fixedly mounting said terminal holder covering on the terminal holders of said windings outside said cover shells, and then mounting a printed circuit board in said terminal holder covering and electrically connecting said windings to said printed circuit board, and then closing said hinged lid of said terminal holder covering.

2. The PM (phase modulation) step motor fabrication method according to claim 1, wherein the connections between the locating pins of said top cap and the mounting holes of said first annular cover shell are sealed by a spot welding apparatus before the assembly of said annular intermediate metal plates, said windings, said cover shells and said top cap is put in an injection molding mold.

3. The PM (phase modulation) step motor fabrication method of claim 1, wherein the plastic material injection-molded during the step of preparing a stator does not cover the enameled wires of said windings.

* * * * *